Patented Jan. 7, 1930

1,742,609

UNITED STATES PATENT OFFICE

JOHN McGAVACK, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

TREATMENT OF RUBBER AND PRODUCTS OBTAINED THEREBY

No Drawing.   Application filed September 20, 1928. Serial No. 307,339.

This invention relates to new and useful rubber or rubber and fabric articles and their manufacture. More specifically it aims to provide rubber or rubber and fabric articles having substantially increased flexing capacity before rupture or separation occurs.

The invention particularly relates to the manufacture of articles comprising rubber which are to be used in such a way that the rubber or rubber and fabric layers are subjected to flexing. Examples of such articles are pneumatic tires, belts for various purposes made of rubber and fabric, tubular articles such as hose, footwear articles, and many other types of rubber goods. It is of greatest importance in such cases to provide a combination which will permit of repeated flexing without rupture or separation of the rubber and fabric, since once this has occurred the useful life of the articles in most cases soon ceases.

Until recently there has been no satisfactory method known for improving the capacity of a rubber compound to withstand such action without separation from the fabric, except to use a high percentage of rubber in the compound, thereby considerably increasing the cost. It is known however, that fabric treated with rubber latex and subsequently coated with rubber have an increased flexing life.

One of the objects of this invention is to prepare an improved flexing compound which when compared with ordinary carcass stock, upon flexing shows a considerably increased flexing value. Another object is to improve the present market grade of crude rubber and particularly to bring spray dried rubber up to a point when it is as good or better than smoked sheet or other market grades from the standpoint of flexing.

It has been found that such objects can be attained when derivatives of thymol, namely thymo-quinone, nitroso thymols, amino thymols and similar bodies, or when alpha or beta naphthoquinone, are added to the ordinary flexing compound. These materials may be used singly or mixed as desired. The particular advantage of using materials of this type is that they are non-explosive and can be readily molded or incorporated into the rubber in small amounts to provide greatly improved flexing values. This means that these materials are suitable ones to mix in carcass stocks for the manufacture of tires, belting, etc., which material must stand severe flexing; particularly they are suitable for plied rubber stocks where whale or latex-sprayed rubber are used. The following examples illustrate the invention:

Example 1

| | Parts |
|---|---|
| Whale rubber (spray dried rubber) | 100 |
| Sulphur | 3.75 |
| Zinc oxide | 5 |
| Mineral oil | 5 |
| Thymo-quinone | 1 |
| Heptaldehyde aniline condensation product | .5 |

This compound flexes about 300% better than the same compound in the absence of thymoquinone.

Example 2

| | Parts |
|---|---|
| Whale rubber | 100 |
| Sulphur | 3.75 |
| Zinc oxide | 5 |
| Mineral oil | 5 |
| Heptaldehyde aniline condensation product | .5 |
| Nitroso thymol | .5 to 1 |

Such a compound flexes about 200% better than the same compound in the absence of nitroso thymol.

Example 3

| | Parts |
|---|---|
| Whale rubber | 100 |
| Sulphur | 3.75 |
| Zinc oxide | 5 |
| Mineral oil | 5 |
| Heptaldehyde aniline condensation product | .5 |
| Amino thymol | .5 |

This compound flexes about 100% better than the same compound without the amino thymol.

Example 4

| | Parts |
|---|---|
| Whale rubber | 100 |
| Zinc oxide | 5 |
| Mineral oil | 5 |
| Sulphur | 3.75 |
| Heptaldehyde aniline condensation product | .5 |
| Beta naphthoquinone | 1 |

This compound flexes about 125% better than the same compound without beta naphthoquinone.

Example 5

| | Parts |
|---|---|
| Smoked sheet | 100 |
| Zinc oxide | 5 |
| Mineral oil | 5 |
| Sulphur | 3.75 |
| Heptaldehyde aniline condensation product | .50 |
| Thymoquinone | .20 |

The invention is capable of wide use in the manufacture of all rubber articles where good flexing is desirable, and it is of particular value for use with the usual vulcanized articles of commerce which are built up of layers of fabric and rubber, such as tires, belting, hose, etc. It imparts to all-solids-content-latex rubbers, that is spray-dried rubbers, flexing characteristics comparable with or superior to those of pale crepe, smoked sheet, etc., while at the same time retaining the valuable properties of quick cure, high tensile strength, etc., which are characteristic of the all-solids-content-latex-rubbers. The flex-imparting materials may be incorporated into the latex before it is dried, if desired. In the usual course of manufacture, a fabric and rubber article will ordinarily be built up and then vulcanized, but in certain cases such as waterproof clothing, the rubberized fabric is sometimes first vulcanized and then made into the desired article or it may be partially vulcanized, made into the article and vulcanization then completed. In some cases the flex-imparting material may be applied directly to the fabric or other form of fibrous material, as by painting, subsequently diffusing into the rubber associated therewith in the construction of the article.

While in the examples given, certain vulcanizing ingredients are disclosed, the invention is not to be limited to these and it may be carried out by the use of any other suitable material. Also with the detailed disclosure above given it is obvious that modifications will suggest themselves and it is not desired to limit the invention otherwise than as set forth in the appended claims.

Having thus described my invention, what I claim and desire to protect by Letters Patent is:

1. The method of increasing the flexing value of a vulcanizable rubber compound, which comprises treating said rubber compound with a material selected from the following group,—thymo-quinone, nitroso thymol, amino thymol, alpha naphthoquinone, beta naphthoquinone,—and vulcanizing.

2. The method of making rubber articles of high flexing capacity, which comprises associating rubber with a derivative of thymol, and vulcanizing.

3. The method of making rubber articles of high flexing capacity, which comprises associating solid rubber with thymo-quinone, and vulcanizing.

4. A vulcanized product of a mixture of a vulcanizable rubber compound and a material selected from the following group,—thymo-quinone, nitroso thymol, amino thymol, alpha naphthoquinone and beta naphthoquinone.

5. A rubber compound containing a derivative of thymol.

6. A product consisting of a mixture of a vulcanizable rubber compound and thymoquinone.

7. A rubber stock containing thymoquinone.

8. A rubber stock containing a derivative of thymol.

9. A fabric rubber stock containing thymoquinone.

Signed at Passaic, county of Passaic, State of New Jersey, this 17 day of September, 1928.

JOHN McGAVACK.